(12) United States Patent
Lee et al.

(10) Patent No.: US 7,076,093 B2
(45) Date of Patent: Jul. 11, 2006

(54) STRUCTURE-GUIDED IMAGE INSPECTION

(76) Inventors: Shih-Jong J. Lee, 15418 SE. 53rd Pl., Bellevue, WA (US) 98006; Seho Oh, 5025 145th Pl. SE., Bellevue, WA (US) 98006

( * ) Notice: Subject to any disclaimer, the term of this patent is extended or adjusted under 35 U.S.C. 154(b) by 744 days.

(21) Appl. No.: 10/247,723

(22) Filed: Sep. 16, 2002

(65) Prior Publication Data

US 2004/0052417 A1 Mar. 18, 2004

(51) Int. Cl.
*G06K 9/00* (2006.01)

(52) U.S. Cl. .................. 382/141; 382/199; 382/149; 382/203

(58) Field of Classification Search ............... 382/141, 382/149, 152, 190, 199, 203, 206, 209
See application file for complete search history.

(56) References Cited

U.S. PATENT DOCUMENTS

| | | | | |
|---|---|---|---|---|
| 5,758,129 A | * | 5/1998 | Gray | 345/572 |
| 5,881,170 A | * | 3/1999 | Araki et al. | 382/199 |
| 6,459,809 B1 | * | 10/2002 | Jensen et al. | 382/203 |
| 6,751,363 B1 | * | 6/2004 | Natsev et al. | 382/305 |
| 2002/0010704 A1 | * | 1/2002 | Kim et al. | 707/102 |
| 2002/0044689 A1 | * | 4/2002 | Roustaei et al. | 382/199 |

OTHER PUBLICATIONS

Baxes, Digital Image Processing, 1994, John Wiley & Sons, pp. 88-93.*

Silver, B, "Geometric Pattern Matching for General-Purpose Inspection in Industrial Machine Vision", Intelligent Vision '99 Conference—Jun. 28-29, 1999.

Hanks, J, "Basic Functions Ease Entry Into Machine Vision", Test & Measurement World, Mar. 1, 2000 http://www.e-insite.net/tmworld/index.asp?layout=article&articleid=CA187377&pu.

Titus, J, "Software makes machine vision easier", Test & Measurement World, Oct. 15, 2001 http://www.e-insite.net/tmworld/index.asp?layout=article&articleid=CA177596&pu.

Lee, JSJ, Haralick, RM and Shapiro, LG, "Morphologic Edge Detection," IEEE Trans. Robotics and Automation RA3(2):142-56, 1987.

Rosenfeld A, Kak A, "Digital Picture Processing", Academic Press, 1976 pp. 275-289 and pp. 352-357.

* cited by examiner

*Primary Examiner*—Bhavesh M. Mehta
*Assistant Examiner*—John B. Strege

(57) ABSTRACT

A structure-guided transformation transforms a region of an image into a region in the structure-transformed image according to the desired structure. The invention achieves efficient and accurate structure-guided processing such as filtering, detection and comparison in the transformed domain and thereby facilitates use of simple operations to enhance or detect straight lines or edges. Structure information is used to enhance and detect image features of interest even when the shape of the image structure is not regular. Both global and local structures of objects can be inspected. Global structure inspection detects gross errors in image structure; therefore side effects caused by mismatched structure-guided processing are avoided. Subtle defects along the edge of a structure can be detected by local structure inspection. Structure information guidance provides an edge detection inspection system that tolerates significant noise and contrast variations.

8 Claims, 15 Drawing Sheets

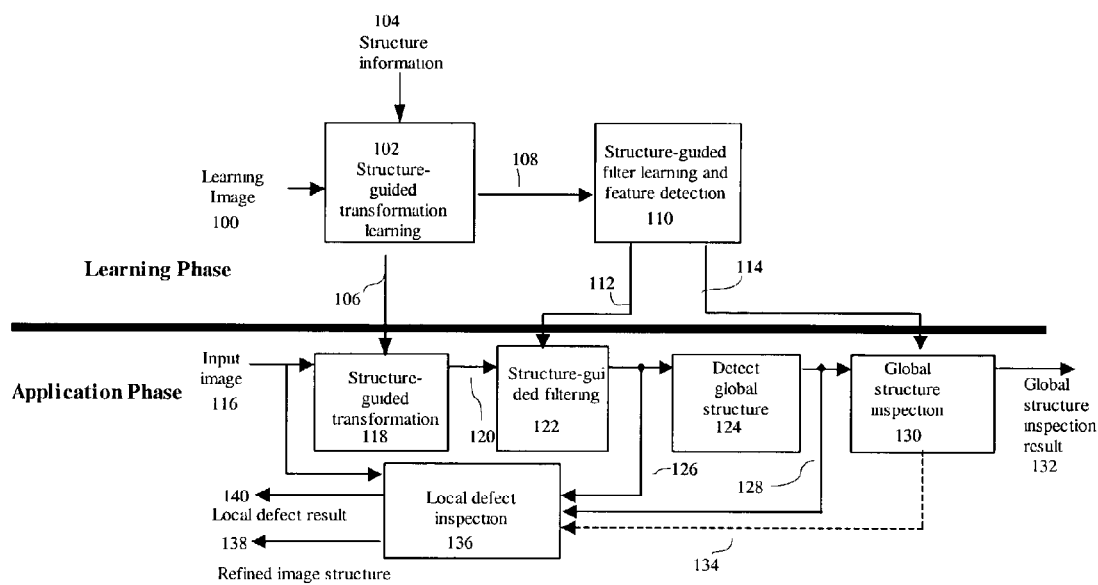
Figure 1
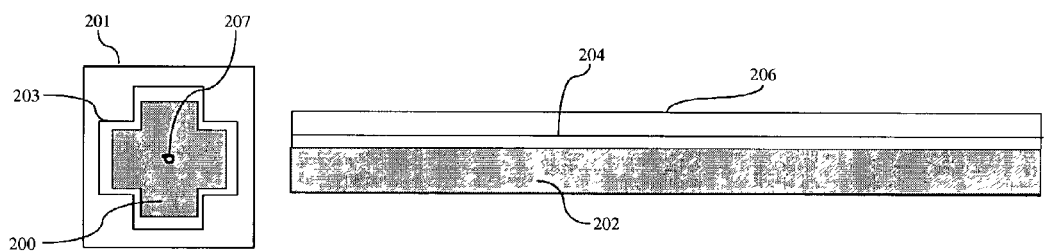
Figure 2A
Figure 2B

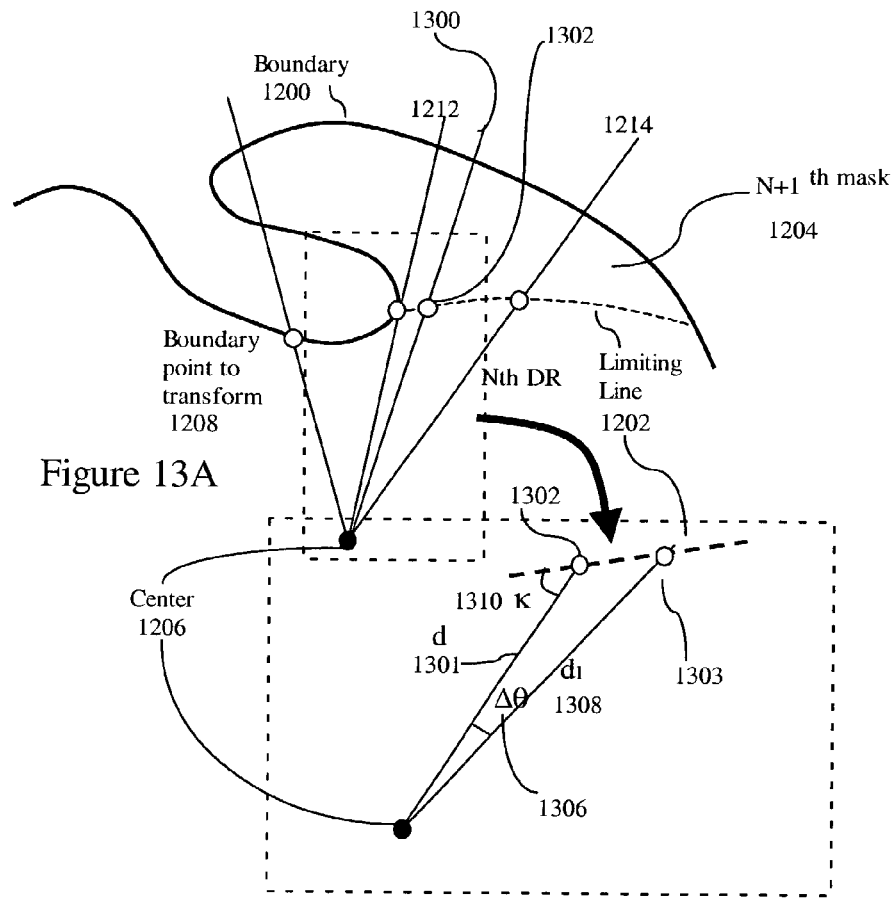
Figure 13A
Figure 13B
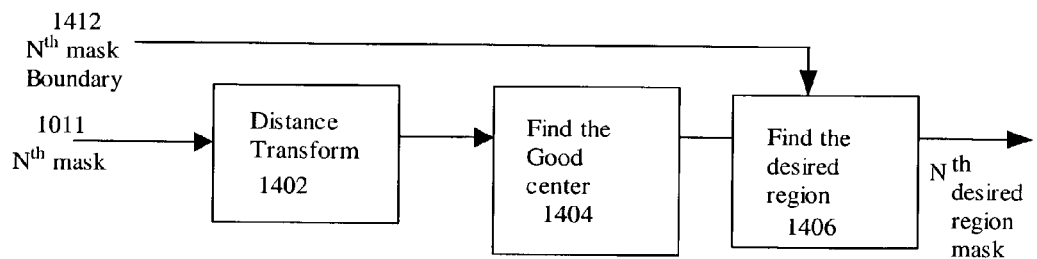
Figure 14

STRUCTURE-GUIDED IMAGE INSPECTION

TECHNICAL FIELD

This invention relates to a method for structure-guided image inspection.

BACKGROUND OF THE INVENTION

Template matching is a general and powerful methodology in machine vision applications. It requires little user technical knowledge or interaction to achieve reasonable performance. Users need only supply template images for matching in the teaching phase. In the application phase, the template is compared to like-sized subsets of the image over a range of search positions. It is robust to linear and some monotonic nonlinear variations in shading and does not require separation of objects from their background (i.e. segmentation) that often introduces errors. Template matching methods have been extended to search an input image for instances of templates that are altered by rotation, scale, and contrast changes.

Template matching methods are primarily developed for location and identification applications. Due to the simplicity and usability, it is tempting to apply template matching to inspection applications and use the resulting matching score to check against a tolerance value for acceptance or rejection criteria. However, small uncertainties at image edges can lead to large uncertainties in image gray values. Large uncertainties in gray values due to normal edge variations in turn limit the ability of template matching methods to discriminate between defects and acceptable variations. A template matching method is least able to detect defects reliably at and around image edges, but unfortunately such edges are often the most critical for inspection because they generally correspond to physical features of the object. The near blindness of template matching method along edges is perhaps its most serious limitation for inspection applications.

Alternatively, edge detection and thresholding methods are used to detect object boundaries of interest and dimensional measurements or defect detection are performed using the detected edges. (Hanks, J, "Basic Functions Ease Entry Into Machine Vision", Test & Measurement World, Mar. 1, 2000, Titus, J, "Software makes machine vision easier", Test & Measurement World, Oct. 15, 2001) An edge represents gray value changes that are high-frequency components in an image. Therefore, edge detection methods are inherently sensitive to noise. Furthermore, edge detection is also sensitive to contrast variations because of its sensitivity to changes.

A structure-guided processing method uses application domain structure information to automatically enhance and detect image features of interest (Lee, S "Structure-guided image processing and image feature enhancement", U.S. patent application Ser. No. 09/738,846, filed Dec. 15, 2000, Lee, S, Oh, S, Huang, C "Structure-guided Automatic Learning for Image Feature Enhancement", U.S. patent application Ser. No. 09/815,466, filed May 23, 2001). The structure information compensates for severe variations such as low image contrast and noise. It retains the ability to detect true defects in the presence of severe process or sensing variations. However, the methods described only enhance regular shape structures such as straight lines, circles, circular arcs, etc. They cannot effectively detect a mismatch between the expected structures and the image features and could generate misleading results when a mismatch exists.

To perform an inspection using the prior art approach, carefully controlled inspection conditions are required. Inspection often fails in applications with significant variations.

The structure-guided inspection method of this invention overcomes the prior art limitations. It is flexible, adaptable (easy to use for a wide range of applications), can deal with noise (difficult cases) and can maximally utilize domain specific knowledge.

OBJECTS AND ADVANTAGES

An objective of the invention is to provide a method that uses structure information to enhance and detect image features of interest even when the shape of the image structure of interest is not regular. A further objective of the invention is to check both global and local structures of objects to be inspected. The global structure inspection detects gross errors in image structure therefore side effects caused by mismatched structure-guided processing are avoided. Furthermore, subtle defects along the edge of a structure can be detected by local structure inspection. Another objective of the invention is to allow an edge detection based inspection system to tolerate significant noise and contrast variations. An additional objective of the invention is to provide a structure-guided transformation that transforms a region of an image into a region in the structure-transformed image according to the desired structure. A further objective of the invention is to achieve efficient and accurate structure-guided processing such as filtering, detection and comparison in the transformed domain and thereby use simple operations to enhance or detect straight lines or edges.

SUMMARY OF THE INVENTION

A structure guided inspection method accepts an input image, performs structure-guided transformation of that image to create a structure-transformed image. Structure detection is performed using the transformed image. The structural transformation recipe can be generated using a contour method or a radial based method. A structure decomposition step can be used for non-convex structures.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 1 shows the processing flow of structure-guided inspection;

FIG. 2A shows a region in the original image;

FIG. 2B shows the transformed structure of FIG. 2A with transformation center at "o" 207; the transformed boundary is a cross-like shape following the outside contour of region 200 in FIG. 2A;

FIG. 13A shows an illustration of the distance from the center of the limiting line ($d_1$) for next angle and the previous distance (d) and the limiting angle K including a region to be expanded;

FIG. 13B shows an expanded view of part of the indicated expansion region of FIG. 13A;

FIG. 14 shows an alternative procedure of Desired Region (DR) selection for $N^{th}$ structure transformation;

DETAILED DESCRIPTION OF THE INVENTION

1. Concept

I. Introduction

Figure 3:
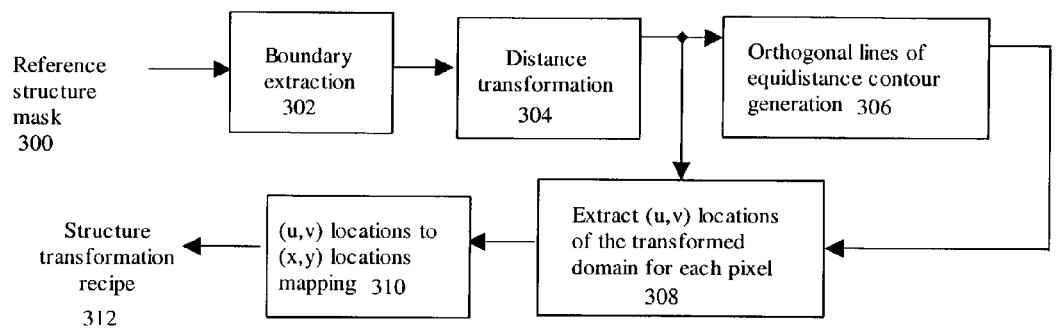
FIG. 3 shows the processing flow of the contour based transformation learning.

Template matching is a general and powerful methodology in machine vision applications. It requires little user technical knowledge or interaction to achieve reasonable performance. Users need only supply template images for matching in the teaching phase. In the application phase, the template is compared to like-sized subsets of the image over a range of search positions. Template matching is robust to linear and some monotonic nonlinear variations in shading and does not require separation of objects from their background (i.e. segmentation) that often introduces errors. Template matching methods have been extended to search an input image for instances of template like regions that have been subjected to rotation, scale and contrast changes (Silver, B, "Geometric Pattern Matching for General-Purpose Inspection in Industrial Machine Vision", Intelligent Vision '99 Conference—Jun. 28–29, 1999, Lee, S, Oh, S, Seghers, R "A Rotation and Scale Invariant Pattern Matching Method", U.S. patent application Ser. No. 09/895,150, filed Jun. 29, 20).

Template matching methods are primarily developed for location and identification applications. Due to the simplicity and usability, it is tempting to apply template matching to inspection applications and use the resulting matching score to check against a tolerance value for acceptance or rejection criteria (Hanks, J, "Basic Functions Ease Entry Into Machine Vision", Test & Measurement World, Mar. 1, 2000 http://www.e-insite.net/tmworld/index.asp?layout=article&articleid=CA187377&pubdate=3/1/2000, Titus, J, "Software makes machine vision easier", Test & Measurement World, Oct. 15, 2001 http://www.e-insite.net/tmworld/index.asp?layout=article&articleid=CA177596&pubdate=10/15/2001). However, small uncertainties at image edges can lead to large uncertainties in image gray values. Large uncertainties in gray values due to normal edge variations, in turn, limit the ability of template matching method to discriminate between defects and acceptable variations. A template matching method is least able to detect defects reliably at and around image edges, but unfortunately such edges are often the most critical for inspection because they generally correspond to physical features of the object. The near blindness of template matching method along edges is perhaps its most serious limitation for inspection applications.

Alternatively, an edge detection and thresholding method is used to detect object boundaries of interest and dimensional measurements or defect detection are performed on the detected edges. Edges represent gray value changes that are high-frequency components in an image. Therefore, an edge detection method is inherently sensitive to noise. Furthermore, it is also sensitive to contrast variations due to the detection of changes. To perform inspection using an edge detection method, carefully controlled inspection conditions are required. Edge detection often fails in applications with significant variations.

A structure-guided processing method uses application domain structure information to automatically enhance and detect image features of interest (Lee, S "Structure-guided image processing and image feature enhancement", U.S. patent application Ser. No. 09/738,846, filed Dec. 15, 2000, Lee, S, Oh, S, Huang, C "Structure-guided Automatic Learning for Image Feature Enhancement", U.S. patent application Ser. No. 09/815,466, filed May 23, 2001). The structure information compensates for severe variations such as low image contrast and noise. It retains the ability to detect true defects in the presence of severe process or sensing variations. However, the methods only enhance regular shape structures such as straight lines, circles, circular arcs, etc. They cannot effectively detect mismatch between the expected structures and the image features and could generate misleading results when mismatch exists.

The structure-guided inspection method of this invention overcomes the prior art limitations. It is flexible, adaptable (easy to use for a wide variety of applications), can deal with noise (difficult cases) and can maximally utilize domain specific knowledge. The invention provides a method that uses structure information to enhance and detect image features of interest when the shape of the image structure is not regular. The invention also checks both global and local structures of objects to be inspected. The global structure inspection detects gross errors in image structure. Therefore side effects caused by mismatched structure-guided processing are avoided. Furthermore, subtle defects along the edge of a structure are detected by local structure inspection. The invention also allows an edge detection based inspection system to tolerate significant noise and contrast variation. The invention provides a structure-guided transformation that transforms a region of an image into a region in the structure-transformed image according to the desired structure. In essence, the invention enhances the image on the basis of the structures that are being inspected for in order to make the inspection for them much easier. In one embodiment of the invention, the contour of the desired structure is lined up to form a straight line in the structure-transformed image. This facilitates efficient and accurate structure-guided processing such as filtering, detection and comparison in the transformed domain using simple operations to enhance or detect straight lines or edges II. Structure-Guided Inspection Approach The structure-guided inspection method of this invention uses structure information to guide image enhancement for reliable feature and defect detection. It checks both global and local structures of objects to be inspected. There is a learning phase and an application phase of the invention. In the learning phase, the structure transformation recipe, structure-guided filter recipe and the expected structure in the transformation domain are generated.

In the application phase, there are two steps in the structure-guided inspection of this invention: a global structure inspection step and a local defect inspection step. The structure-guided inspection is first performed in the global scale that strongly enforces the structure information. It could tolerate high noise, low contrast and small defects yet local details may be replaced by the structure information and may lose their fidelity. Therefore, a local feature detection and inspection step is performed. The global detected features serve as reference to perform local feature detection and defect inspection.

The global structure inspection step determines the estimated global structure of the input image and compares the estimated global structure with the expected structure generated in the learning phase. If the difference between the estimated global structure and the expected structure exceeds the acceptable tolerance, an error will be reported.

After passing the global structure inspection step, the estimated global structure will be used as the basis to check the difference between the structure and image features at different local locations of the image. If significant differences are detected, a local defect will be reported. Otherwise, a refined image structure output that combines the global and local structures is generated. The processing flow for one embodiment of the global and local defect detection is shown in FIG. 1.

In the learning phase, structure information 104 and learning images 100 are used by a structure-guided transformation learning process 102 to create a structure transformation recipe 106. Note that in some applications, only the learning image 100 is required for this learning and the structure information 104 is derived from the learning image 100. In other applications, only structure information 104 is required for this learning. At least one structure-transformed image 108 is created in the learning process. In one embodiment of the invention, a structure-guided filter learning and feature detection process 110 learns a structure-guided filter recipe 112 and generates expected transformed structure 114. The structure-guided filter learning process is performed only when the application requires a structure-guided filter recipe. The learning steps can be performed in the field in a learnable automatic inspection system or performed by the inspection system supplier in the factory. The learning can be conducted manually or performed by a learning system automatically or semi-automatically.

In the application phase, an input image 116 is processed by the structure-guided transformation step 118 using the structure structure-transformation recipe 106 to generate a structure-transformed image output 120. In one embodiment of the invention, the structure-transformed image 120 has a flat (or linear) boundary for objects having the desired structure. The structure-guided transformation 118 may involve multiple separate transformations for different portions of the structure. In some applications, structure-guided filtering 122 is applied to create a structure filtered image output 126. The filtering operation 122 removes noise and enhances contrast using the structure information. From the filtered image 126, the global structure is detected 124 having detected global structure outputs 128 and compared with the expected structure 114 in a global structure inspection step 130 to generate a global structure inspection result output 132. If the difference is significant, the input image 116 is corrupted in global structure. When the difference is small 134, the filtered image 126, detected global structure 128, and input image 116 could be further processed by the local structure defect inspection stage 136 to detect local defects, producing a local defect result output 140. In addition, a refined image structure output 138 that combines the global and local structures could be generated that removes noise yet preserves local details.

III. Structural-Guided Transformation

Structure-guided transformation transforms a region of an image into a region in the transformed image according to the desired structure. In one embodiment of the invention, the contour of the desired structure is lined up to form a straight line in the structure-transformed image. This facilitates efficient and accurate structure-guided processing such as filtering, detection and comparison in the transformed domain using simple operations that are designed to enhance or detect straight lines or edges. In this way, all operations are simple and unified regardless of the differences in structures. FIGS. 2A and 2B show an example of a structure-guided transformation for cross like structures 200 and 203.

As shown in FIGS. 2A and 2B, a region 201 with cross-like structures 200 and 203 is structure-transformed into a region of a dark rectangular shape 202 and a straight line 204 within a region 206. The reference structure for transformation is identical to the outer contour of the structure 200 of FIG. 2A. The transformation simplifies and unifies the follow-on structure-guided processing. The structure-guided processing can be designed to handle only rectangular shaped regions and straight lines or edges regardless of the original structure of the object.

The structure-guided transformation learning process 102 creates a structure transformation recipe 106 for a given structure 104. The recipe is used in the application phase to efficiently perform structure-guided transformation 118. In the learning phase, the structure transformation recipe 106 is generated from the learning image 100 and/or reference structure input 104. In one embodiment of the invention, the reference structure is read from a Computer Aided Design (CAD) data file. In another embodiment of the invention, the reference structure is specified by users through a graphical interface. In a third embodiment of the invention, the reference structure is derived from the learning image by image processing either semi-automatically or automatically. The reference structure includes the contour of the structure and reference points or coordinates for alignment.

In one embodiment of this invention there are two types of structure-guided transformation: a contour based transformation, and a radial based transformation. The contour based transformation can be used for reference structures with simple closed or open contours. The radial based transformation can be used for more complicated reference structures. The radial based transformation includes methods to decompose a complicated shape into multiple components and perform structure-guided transformation of each component and integrate them into one transformed image.

III.1 Contour Based Structure-Guided Transformation

Figure 4:
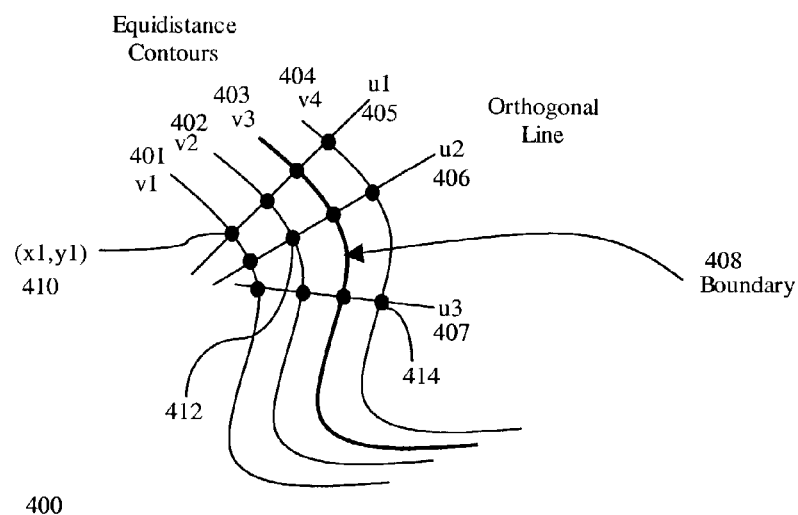
FIG. 4 shows (u,v) values in the original (x,y) coordinate system.

Contour based structure-guided transformation can be used for simple open or closed contours. In one embodiment of the invention, the processing flow of contour based transformation learning is shown in FIG. 3. The structure information is represented by a reference structure mask 300. In the learning phase, the boundary of the reference structure mask can be extracted by a boundary extraction step 302. In one embodiment of the invention, the boundary extraction step 302 is accomplished by an edge detection process. Many edge detection methods such as the gradient based method (Rosenfeld A, Kak A, "Digital Picture Processing", Academic Press, 1976 PP. 275–289) or morphological edge detection (Lee, J S J, Haralick, R M and Shapiro, L G, "Morphologic Edge Detection," IEEE Trans. Robotics and Automation RA3(2): 142–56, 1987) can be used. From the extracted reference structure boundary 302, a distance transformation 304 (Rosenfeld A, Kak A, "Digital Picture Processing", Academic Press, 1976 PP. 352–357) is performed in the learning phase. The distance transformation labels each pixel by its shortest distance to the reference structure boundary. The distance value is used as the v-value for the pixel in the structure transformed domain. The u-value of the structure-transformed domain is the distance from the starting point of the equidistance contours 306. This value is measured by counting the number of orthogonal lines along the equidistance contours. The output 312 of the mapping function in FIG. 3 is a structure transformation recipe. A simple example of the (u,v) values (in the transformed image) specified as image pixels in the original (x,y) coordinate system 400 are illustrated in FIG. 4. A boundary 408 is defined and equidistant contours 401, 402, 403, 404 intersect with equidistant orthogonal lines along the boundary 405, 406, 407.

Figure 5:
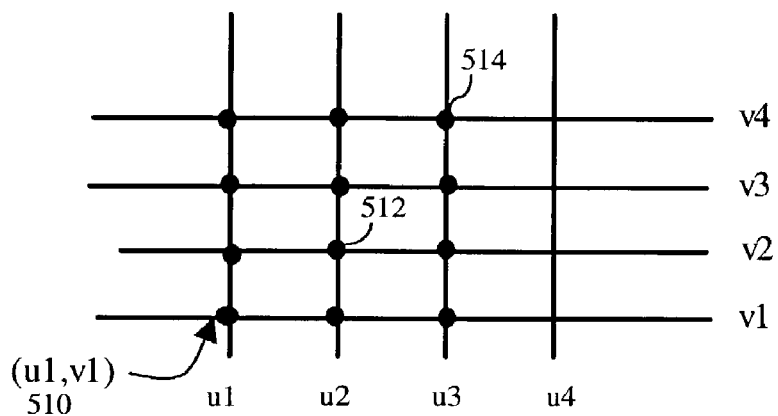
FIG. 5 shows (u,v) values in the transformed coordinate system.

The FIG. 4 example (u,v) values (u1,v1) 410, (u2,v2) 412, . . . (u3,v4) 414 are lined up in the transformed coordinate system as shown in FIG. 5. The structure transformation recipe 312 performs a mapping from the (x,y) domain to the (u,v) domain. In this illustration, (x,y) locations 410, 412, 414 map into (u,v) locations 510, 512, 514 respectively. In one embodiment of the invention, a nearest neighbor approach is used for the mapping. This results in a mapping look-up table. The mapping lookup table is the structure transformation recipe 312 generated from the learning phase. It is indexed by (u,v) values and stores the corresponding (x,y) coordinate for each (u,v) pixel location.

Those skilled in the art should recognize that other mapping methods such as linear or nonlinear interpolation could be used.

In the application phase, the contour based structure-guided transformation is as simple as reading the mapping look-up table to determine the corresponding (x,y) pixel location for each (u,v) coordinate and then read the input image value from the (x,y) pixel location and assign to the (u,v) location of the transformed image. Depending on the application, some pre-alignment step may be necessary to align the input image with the reference structure mask (Lee, S, Oh, S, Seghers, R "Structure-guided Automatic Alignment for Image Processing", U.S. patent application Ser. No. 09/882,734, filed Jun. 13, 2001).

Figure 6A:
FIG. 6A shows an example reference structure.
Figure 6B:
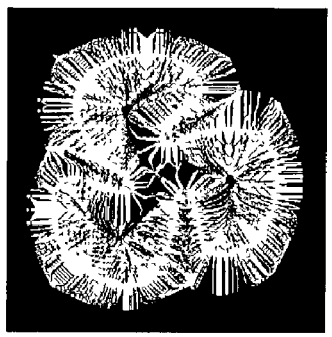
FIG. 6B shows orthogonal lines of equidistance contour superimposed on the structure shown in FIG. 6A.
Figure 6C:
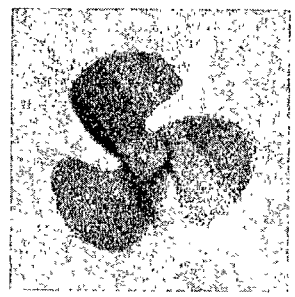
FIG. 6C shows an input image.
Figure 6D:
FIG. 6D shows the structure-transformed image of FIG. 6C.
Figure 6E:
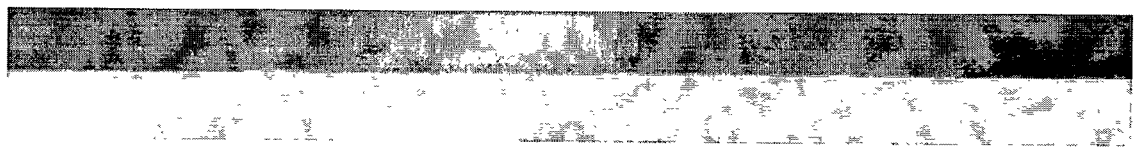
FIG. 6E shows automatic filtering on the transformed image of FIG. 6D.
Figure 6F:
FIG. 6F shows an automatically filtered image result for the filtering shown in FIG. 6E.
Figure 6G:
FIG. 6G shows edge detection performed on the transformed image of FIG. 6D.
Figure 6H:
FIG. 6H shows the detected edge pixels in the transformed domain.
Figure 6I:
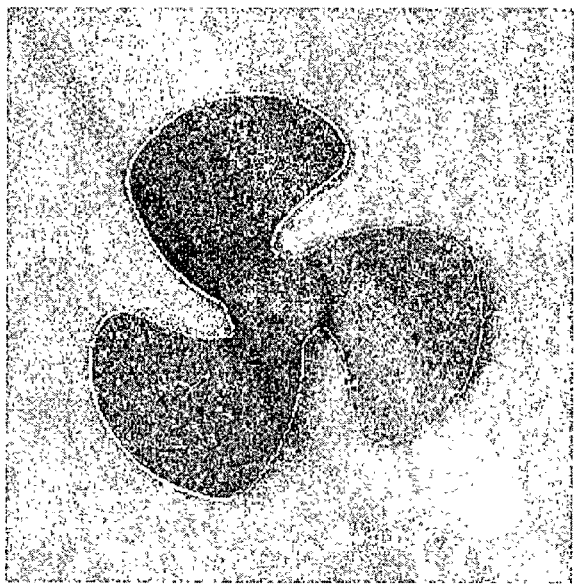
FIG. 6I shows the detected edge pixels overlaid on the noisy image of FIG. 6C.
Figure 6J:
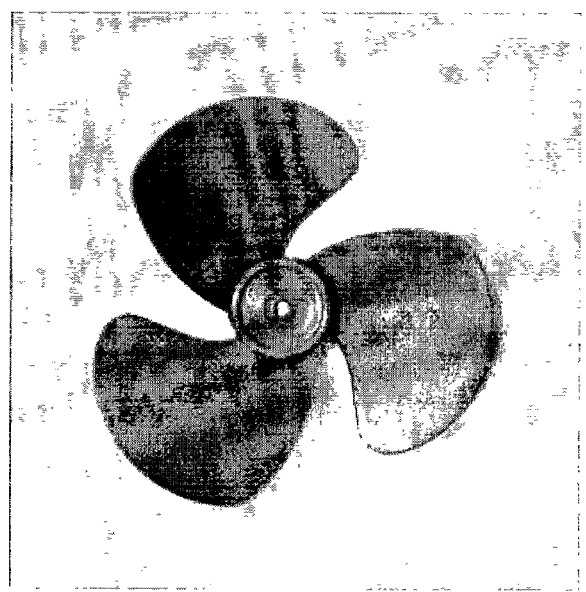
FIG. 6J shows an ideal image of the same scene as FIG. 6C.
Figure 6K:
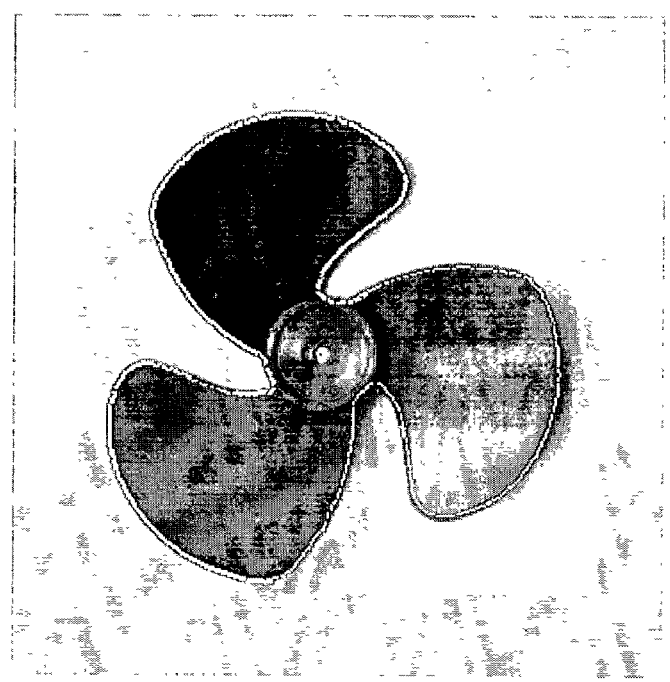
FIG. 6K shows detected edge pixels overlaid on the ideal image of FIG. 6J.

FIGS. 6A through 6I show an example reference structure (FIG. 6A); the orthogonal lines of equidistance contour (FIG. 6B); an input image (FIG. 6C); and the structure-transformed image (FIG. 6D), the filtered transformed image (FIG. 6E), the image effect of FIG. 6E filtering is shown in FIG. 6F, an edge filtered result for the FIG. 6D image is shown in FIG. 6G, the detection of edges in the transformed domain following filtering is shown in FIG. 6H; an edge overlay on the noisy image of FIG. 6C is shown in FIG. 6I; an ideal image of the same part shown in FIG. 6C is shown in FIG. 6J; an edge overlay on the ideal image is shown in FIG. 6K.

III.2 Radial Based Structure-Guided Transformation

The radial based structure-guided transformation can be used for reference structures with complex contours. The method normalizes the distance of the boundary from a given center point. It includes two steps: determining the center for transformation of a reference structure and performing radial based transformation.

III.2.1 Determining the Center for Transformation

If the difference between the maximum and minimum distance of the boundary is large in a radial based structure-guided transformation, the dynamic range of the transform is also large. Since the input image has fixed resolution, the precision of the transformed domain is degraded when large dynamic range is required. The center location plays a significant role in the required dynamic range for the transformation. A good center location is one that has the smallest difference between the maximum and minimum distance to the boundary. In one embodiment of the invention, this center point is determined by the following steps:

1. Determine the boundary of the reference structure;
2. Perform a distance transformation of the boundary;
3. Select a point having the maximum value in the distance transformed image of the boundary.

III.2.2 Performing Radial Based Transformation

Figure 7A:
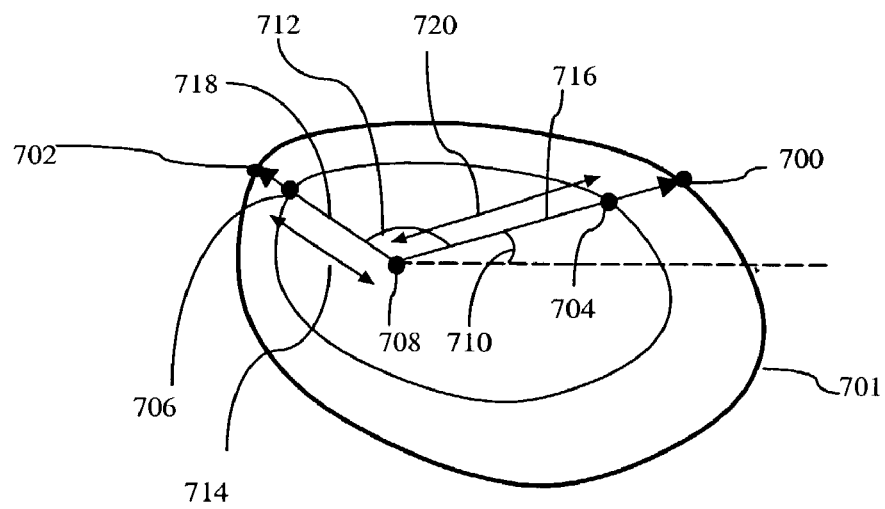
FIG. 7A shows the trajectory of the lines in an original image.
Figure 7B:
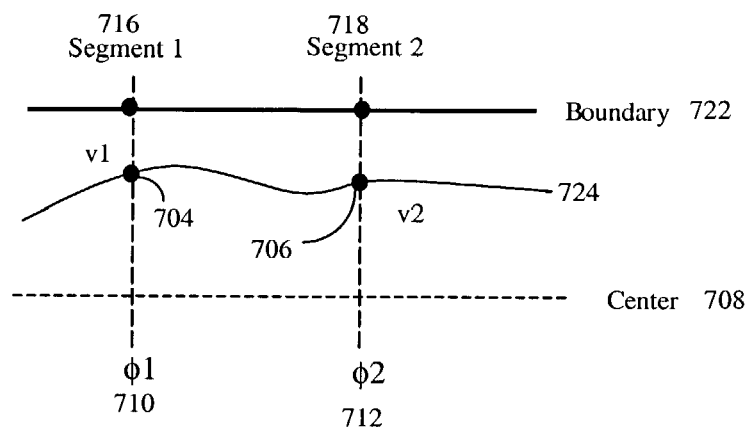
FIG. 7B shows the transformed coordinate systems of the FIG. 7A image after the radial based structure-guided transformation.

In one embodiment of the invention, the u-axis of the transformed domain is the radial angle and the v-axis of the transformed domain is the normalized distance. FIG. 7 illustrates the concept of this method. As shown in FIG. 7, the Euclidian distance to the boundary point 1 700 from the center 708 (along line segment 1 716) is R1, and the Euclidian distance from the center 708 to a boundary point 2 702 (along line segment 2 718) is R2. Let d1 720 be the distance from the center 708 to point 3 704 and d2 714 be the distance from the center 708 to point 4 706. φ1 710 is the angle from the horizontal to line segment 1 716. φ2 712 is the angle from line segment 1 716 to line segment 2 718. If the v-value of the boundary points in the transformed domain is given a value vr, then the v-value of point 3 704 in line segment 1 716 is v1=vr*d1/R1, and the v-value of point 4 706 in line segment 2 718 is v2=vr*d2/R2. Note that v-values of the boundary points in the reference structure mask are the same (vr) in the transformed domain. Referring now to FIG. 7B, the transformation space shows the boundary line 722 (which corresponds to the boundary line 701 in FIG. 7A), the center 708, the two included angles φ1 710, and φ2 712, and the contour intersections point 3 704, point 4 706, and line segment 1 716 and line segment 2 718 drawn perpendicular to the boundary 701 in FIG. 7A and now defining the transformed coordinate space in FIG. 7B 722.

A special case of the radial based structure-guided transformation is the polar coordinate transform. In this case, the relationship between (x,y) in the original coordinate system and (u,v) in the transformed coordinate system is $$x=v*\cos(u)+x_c$$

$$y=v*\sin(u)+y_c.$$

where $(x_c, y_c)$ is the center of the transformation.

In the learning phase, the radial based structure-guided transformation learning determines the (u,v) locations of the transformed domain for each pixel in (x,y) domain. The (u,v) locations are determined using the u-axis of the transformed domain as the radial angle and the v-axis of the transformed domain as the normalized distance from a given center point. The structure transformation learning determines the mapping for each point in the (u,v) domain using points in the (x,y) domain. In one embodiment of the invention, a nearest neighbor approach is used for the mapping. This results in a mapping look-up table stores corresponding (x,y) values indexed by (u,v). The mapping lookup table is the structure transformation recipe.

Those skilled in the art should recognize that other mapping methods such as linear or nonlinear interpolations could be used.

Figure 8A:
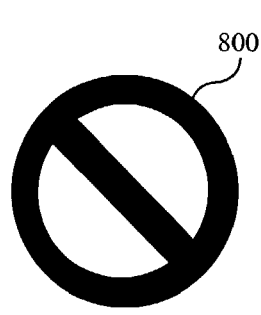
FIG. 8A shows one example of a non-convex reference structure.
Figure 8B:
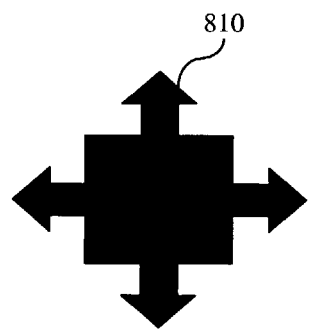
FIG. 8B shows a second example of non-convex reference structure.

III.3 Structure Decomposition in a Radial Based Structure-Guided Transformation If the reference structure is convex, then the radial based structure-guided transformation requires only one transformation. However, in complicated cases, multiple separate transformations can be performed for different portions of the structure. The partial results from multiple transformation domains are then integrated to form the final result. When the multiple transformations are required, the region of the reference structure mask is decomposed into different components. Each component has its own structure transformation. FIGS. 8A and 8B show two examples of complicated reference structures 800, 810. In one embodiment of the invention, users provide a mask of the reference structure. In another embodiment of the invention, the reference structure mask can be extracted from learning images with user selected threshold or user drawn masks. In a third embodiment of the invention the reference structure mask is selected from a CAD model.

Figure 9A:
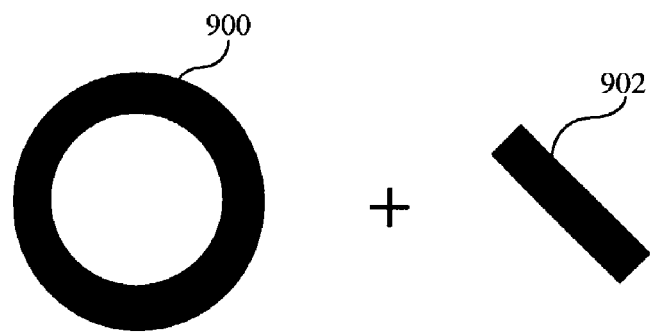
FIG. 9A shows possible decomposition of the non-convex reference structure of FIG. 8A.
Figure 9B:
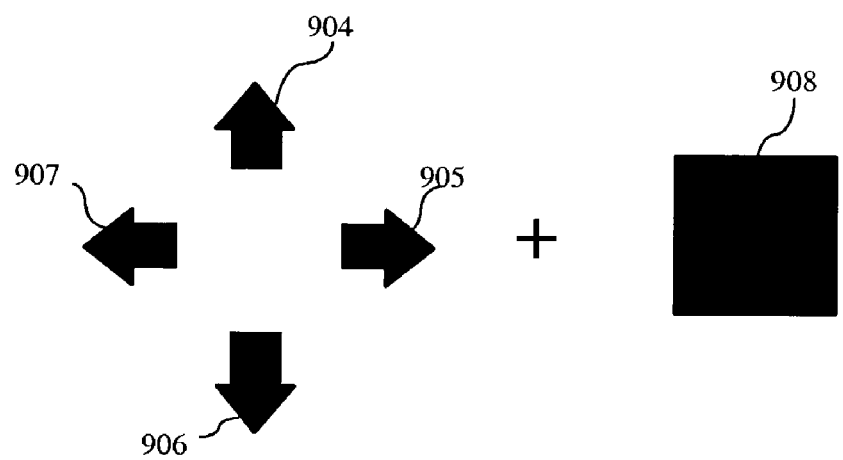
FIG. 9B shows possible decomposition of the non-convex reference structure of FIG. 8B.

In the case of complex structures such as 800 and 810, users may be asked to perform the decomposition. In another embodiment of the invention, the structure-guided inspection system could provide assistance to users for the decomposition. In a third embodiment, the system automatically performs the decomposition. FIGS. 9A and 9B show a possible decomposition of the non-convex structures 800, 810 in FIGS. 8A and 8B. In the examples, structure 800 is decomposed into structures 900 and 902. Structure 810 is decomposed into structures 908 and 904, 905, 906, 907. Note that the decompositions are non-unique. There could be multiple decompositions that would work well.

III.3.1 Automatic Decomposition Method

Figure 10:
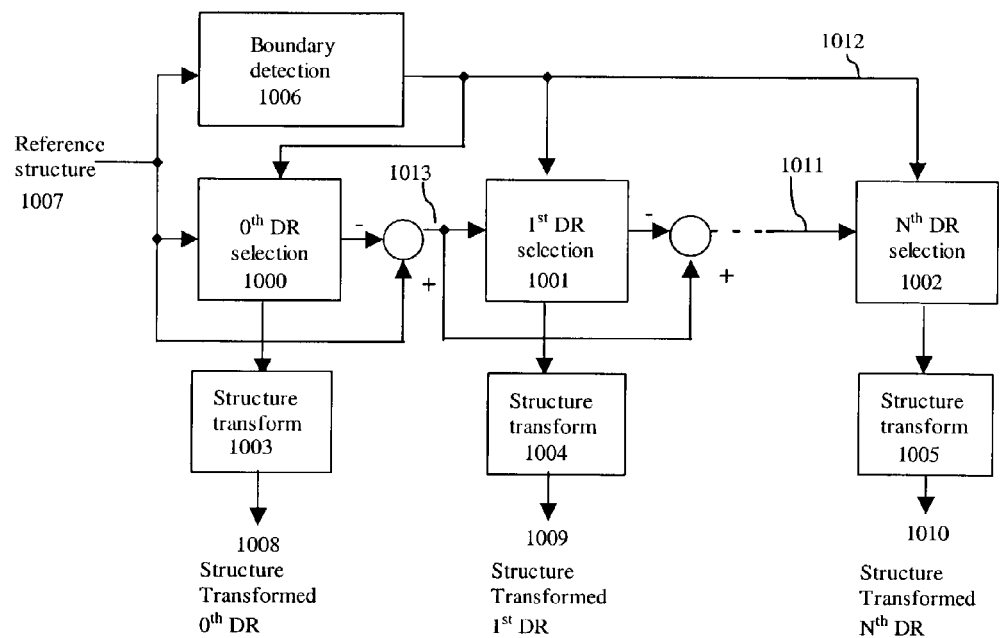
FIG. 10 shows the processing sequence of the automatic decomposition method (The DR selection means Desired Region selection)

When the reference structure mask is given, the automatic decomposition method can be applied. In one embodiment of the invention, the automatic structure decomposition method includes sequential application of operations for decomposition region selection and selected decomposition region exclusion. FIG. 10 shows the procedure of the automatic decomposition method.

Figure 11:
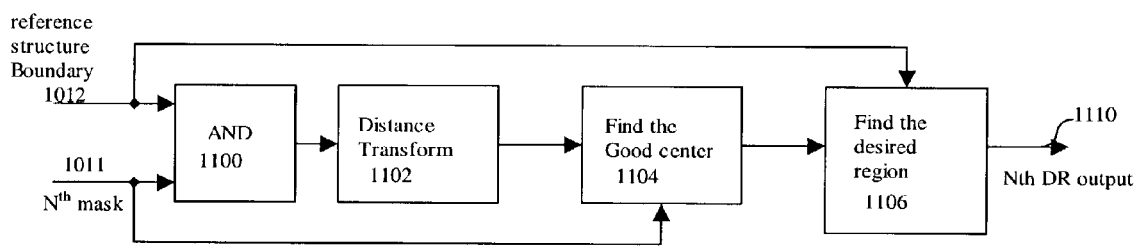
FIG. 11 shows the Desired Region (DR) selection process for $N^{th}$ structure transformation.
Figure 12:
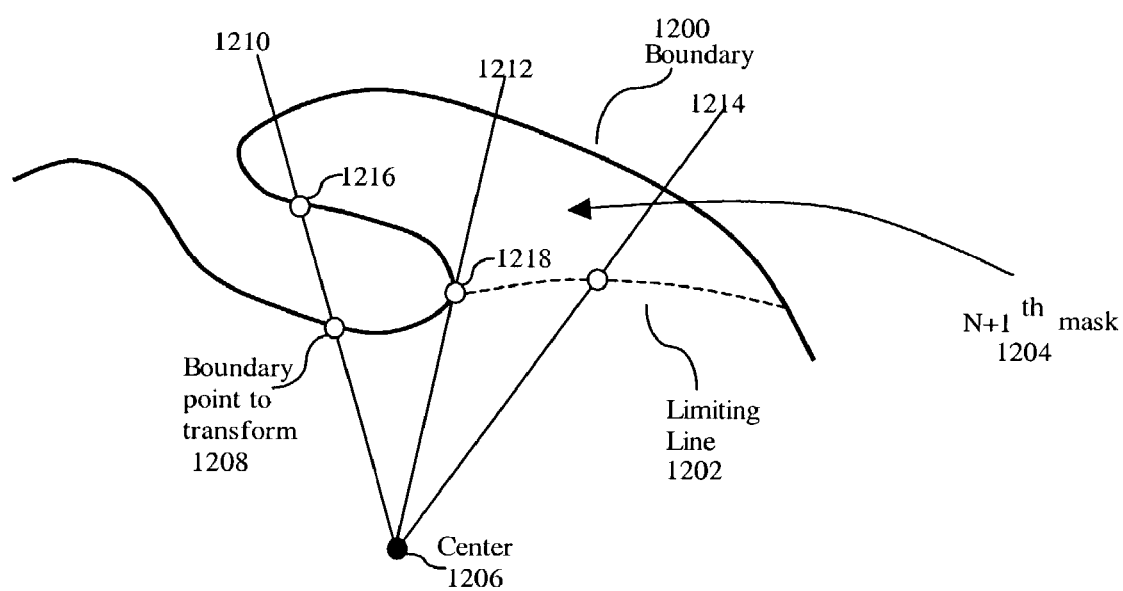
FIG. 12 shows boundary points for desired region selection (If there is big jump of the distance from the center, a limiting line is created)

FIG. 10 shows the processing sequence of the automatic decomposition method. The DR (Desired Region) selection process is further described in FIG. 11. DR selection includes a good center detection step 1104 followed by desired region selection 1106 using the reference structure boundary information 1012 and the remaining mask 1011. The process first performs $0^{th}$ DR selection 1000 and the remaining structure region (original structure minus the $0^{th}$ DR selected region) 1013 is used for the $1^{st}$ DR selection 1001. The process continues 1002 until all regions of the reference structure are selected. The output for each desired region is a structure transformed image for that desired region 1008, 1009, 1010. In FIG. 11, the inputs are the reference structure boundary 1012 and the $N^{th}$ mask 1011. The distance transformation is applied from the boundary 1012 into the $N^{th}$ mask region 1011. The good center for the $N^{th}$ structure transform 1104 is the location which has the maximum distance value within the $N^{th}$ mask. The $N^{th}$ DR output 1110 is the output of the DR selection process.

If more than one point has the maximum distance value within the mask, then any one of the points can be chosen as the center. The boundary of a desired region must be continuous. Therefore, when a line segment 1210, 1212, 1214 starting from center 1206 toward boundary 1200 intersects multiple points on the boundary 1208, 1216, further decomposition that removes that region from the desired Nth region is required. The boundary point that has the shortest distance from the center 1208 is the boundary point to include in the $N^{th}$ region. In one embodiment of the invention, the boundary detection is accomplished by erosion residue using a 3 by 3 structuring element. When the line segment from the center 1206 for a given angle is the tangential line 1212 of the boundary 1200 (shown tangential at boundary location 1218), a limiting line 1202 is generated using the limitation of the distance condition. The limiting line 1202 is then used to separate the $N^{th}$ region and the $N+1^{th}$ region 1204.

In one embodiment of the invention, the method to create the limiting line calculates the maximum distance of the next angle from the center. FIG. 13A and FIG. 13B show one method to calculate the distance of the limiting line 1202 for the next angle. The limiting line 1202 can be defined by the angle between the tangential line 1212 and the radial line 1300. Let this angle be κ 1310; the step angle be Δθ 1306 and the distance from the center 1206 at previous angle to point 1302 be d 1301. The distance from the center to the limiting line (point 1303) can be calculated as $d^1$ 1308 by the following rule $$d_1 = \frac{d}{1 - \Delta\theta \cot \kappa}$$

The above equation is derived by the triangular theorem as illustrated in FIGS. 13A and 13B.

Those skilled of the art should recognize that other methods of desired region selection could be used. For example, an alternative embodiment to select the desired region is shown in FIG. 14. This method is a modified version of the method described in FIG. 11. In the method shown in FIG. 11, the good center of $N^{th}$ mask 1104 is the maximum of the distance transformed values within the $N^{th}$ mask 1011 where the distance transformed image is derived from the overall mask boundary. In the alternative method to find the desired region 1406 as shown in FIG. 14, the good center of $N^{th}$ mask 1404 is the maximum of the distance transform 1402 from only the boundary 1412 of the $N^{th}$ mask image 1011.

Figure 15A:
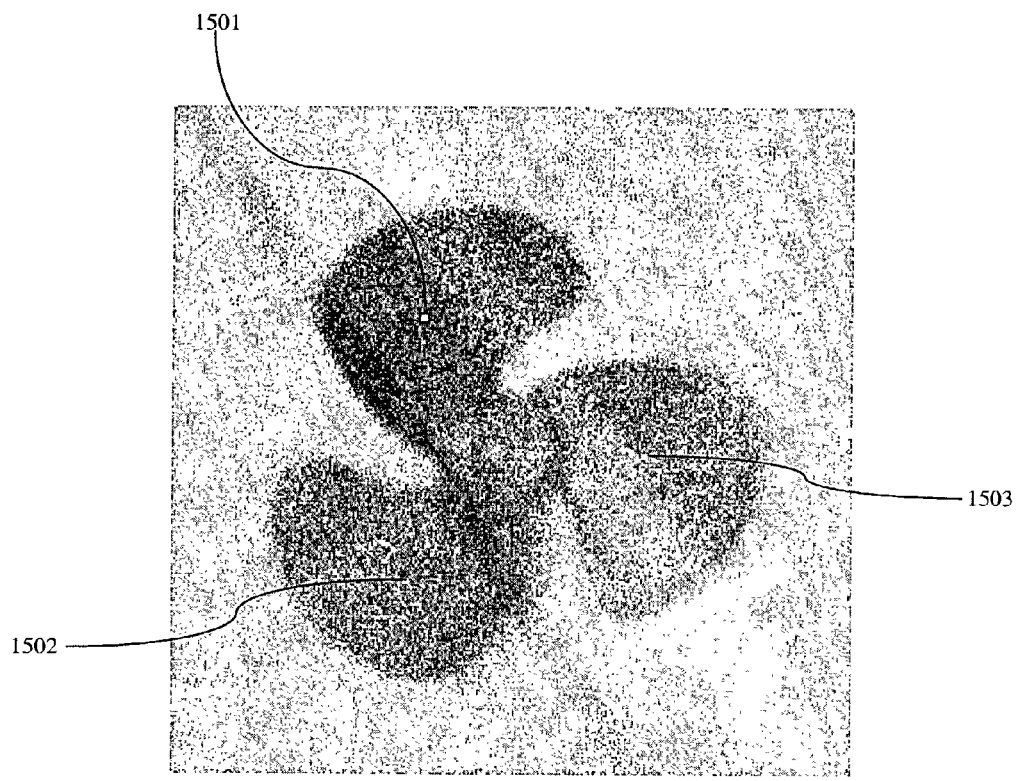
FIG. 15A shows the noisy image of FIG. 6C having three desired regions, the center of each desired region is indicated 1501, 1502, 1503.
Figure 15B:
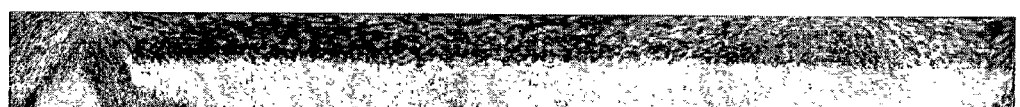
FIG. 15B shows the transformed image of the first desired region of FIG. 15A.
Figure 15C:
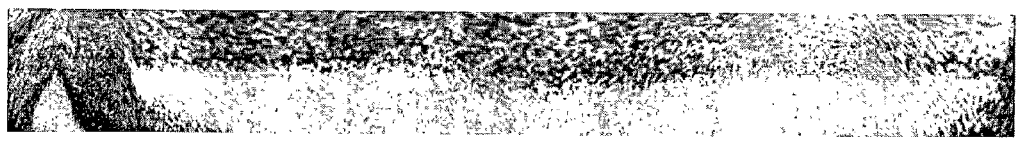
FIG. 15C shows the transformed image of the second desired region of FIG. 15A.
Figure 15D:
FIG. 15D shows the transformed image of the third desired region of FIG. 15A.
Figure 15E:
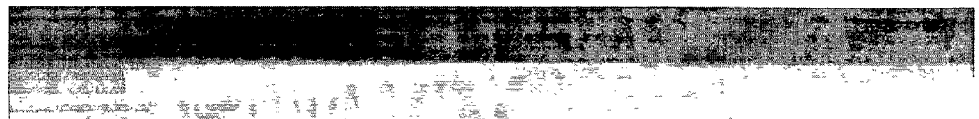
FIG. 15E shows the filtered transformed image of the first desired region shown in FIG. 15B.
Figure 15F:
FIG. 15F shows the filtered transformed image of the second desired region shown in FIG. 15C.
Figure 15G:
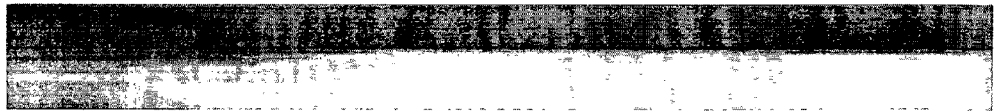
FIG. 15G shows the filtered transformed image of the third desired region shown in FIG. 15C.
Figure 15H:
FIG. 15H shows the multiple radial base automatic filtering result.

An example of multiple radial based transformation is given in FIGS. 15A, 15B, 15C, 15D, 15E, 15F, 15G, 15H. FIG. 15A shows the noisy image of FIG. 6C having three desired regions, the center of each desired region is indicated by a white dot 1501, 1502, 1503. FIG. 15B shows the transformed image of the first desired region of FIG. 15A. FIG. 15C shows the transformed image of the second desired region of FIG. 15A. FIG. 15D shows the transformed image of the third desired region of FIG. 15A. FIG. 15E shows the filtered transformed image of the first desired region shown in FIG. 15B. FIG. 15F shows the filtered transformed image of the second desired region shown in FIG. 15C. FIG. 15G shows the filtered transformed image of the third desired region shown in FIG. 15D. FIG. 15H shows the multiple radial base automatic filtering result.

IV. Structure-Guided Filtering

The transformed image could have rough or unclean boundary because of the contamination by noise, variations, distortion, defects, and artifacts of transformation. To reduce this effect, structure-guided filtering is applied in one embodiment of the invention. Note that after the transformation, the reference structure becomes a rectangular region. The automatic filtering learning and application method disclosed in a prior invention (Lee, S, Oh, S, Huang, C "Structure-guided Automatic Learning for Image Feature Enhancement", U.S. patent application Ser. No. 09/815,466, filed May 23, 2001) is directly applicable. The structure information is represented by the directional box caliper described in the prior invention.

V. Structure-Guided Feature Detection

The boundary of the transformed image is ideally a horizontal straight line. Therefore, in one embodiment of the invention, the feature detection is performed on the transformed image. This can be done on the filtered or un-filtered transformed image. The filtered image could result in enhanced features. The image features such as edges, lines, texture contrasts, etc. can be detected by the structure-guided image processing and feature extraction method as disclosed in a prior invention (Lee, S "Structure-guided image processing and image feature enhancement", U.S. patent application Ser. No. 09/738,846, filed Dec. 15, 2000). Parametric estimation of the features can be performed. The method as disclosed in a prior invention (Lee, S, Oh, S "Structure-guided Image Measurement Method", U.S. patent application Ser. No. 09/739,084, filed Dec. 15, 2000) can be used for feature estimation. From the extracted features global inspection can be performed.

VI. Global Structure Inspection

The global structure inspection method 130 compares the detected global structure information 128 and the parameters to the expected global structure 114. For example, when the expected structure is a circle, the center location and radius can be compared. Also, the statistics of the radius, such as maximum radius, deviation of the radius can be compared. If the expected structure is a rectangle shape, the angle between the linesat the intersection points can be compared. For structure that is composed of many different geometrical entities, the partial structure information, the parameter and the relative locations of each geometrical entity can be compared with the expected one. If the difference is larger than an allowable threshold, a global defect is reported 132. Otherwise, the structural information is sent 134 to the local structure inspection step 136. In one embodiment of the invention, the comparison is performed in the transformed domain that simplifies the structure representation and comparison to produce a local defect result 140. In an alternative embodiment of the invention, the comparison can be performed by image subtraction (or exclusive OR operation for binary masks) of the detected features and expected feature masks. The difference between the detected and expected images is the non-zero portion of the image. Those skilled in the art should recognize that the image comparison could be performed on either the original image domain or the transformed image domain.

VII. Local Structure Inspection

In one embodiment of the invention, if the global structure defect is not detected 134, the local defect detection 136 is performed from the original input image 116 and filtered output 126 as well as global detection results 128 that are inverse transformed back to the original image domain. Because the automatic filtered output 126 enhances the expected structure, the filtered output can be used as a reference for local structure inspection. The local inspection step 136 first extracts local features from the original image or original image with local enhancement. The local feature extraction can be performed using the structure-guided processing method as disclosed in a prior invention (Lee, S "Structure-guided image processing and image feature enhancement", U.S. patent application Ser. No. 09/738,846, filed Dec. 15, 2000). The locally detected features are refined using the structure filtered output 126 from the global inspection. The local inspection step compares the refined feature detection results with the globally estimated ones. In one embodiment of the invention, the comparison can be performed by image subtraction (or exclusive OR operation for binary masks) of the detected features and expected feature masks. The difference between the detected and expected images is the non-zero portion of the image. If the difference is greater than an allowable tolerance threshold, a local defect is detected 140.

VII.1 Local Feature Refinement

From the global filtered image and the locally detected features, the refined features are generated to represent image structure. In one embodiment of the invention, the method to refine the features from the global filtered image and the locally detected features maximizes the feature intensity with constraints such as $$Gain = \Sigma\{FI[x][y]\}^2 - \alpha * \Sigma\{\delta x * FI_x[x][y] + \delta y * FI_y[x][y]\}^2$$

where FI[x][y] is magnitude of the feature intensity such as gradient values of the boundary, $FI_x[x][y]$ and $FI_y[x][y]$ are x and y components of the feature intensity. δx and δy are the displacement in x and y directions at location (x,y). α is a refinement parameter. The location that maximizes the gain is the refined location of the features. The initial feature location is derived from the local feature detection result and the feature intensity and adjustment is performed on the global filtered image. The refined image structure output 138 that combines the global and local structures could remove noise yet preserve local details.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A structure-guided inspection method comprising the following steps:
   a) Inputting an image and structure information represented by a reference structure mask and expected global structure;
   b) Performing structure-guided transformation using the image and the structure information having a structure-transformed image output wherein the contour of the input image having desired structure from the reference structure mask is lined up to form a straight line in the structure-transformed image;
   c) Performing global structure detection using the structure-transformed image having at least one detected global structure output;
   d) Performing global structure inspection having at least one global structure inspection result output wherein the global structure inspection compares the detected global structure and the parameters to the expected global structure.

2. The method of claim 1 further comprises a structure-guided filtering step that processes the structure-transformed image using automatic filtering learning and application method having a structure filtered image output.

3. The method of claim 1 further comprises a local defect inspection step having a local defect result output wherein the local defect result contains a local defect or a refined image structure output that combines the global and local structures.

4. The method of claim 1 wherein the structure-guided transformation is generated by a contour based method.

5. The method of claim 1 wherein the structure-guided transformation is generated by a radial based method.

6. A structure-guided transformation learning method comprising the following steps:
   a) Inputting a reference structure;
   b) Performing a structure-guided transformation wherein the contour of the desired structure from the reference structure is lined up to form a straight line in the structure-guided transformation using a method selected from the set consisting of:
      i. Contour based method,
      ii. Radial based method;
   c) Generating a structure transformation recipe output.

7. The method of claim 6 wherein the contour based method comprises the following steps:
   a) Extracting the boundary of the reference structure;
   b) Performing a distance transformation from the boundary wherein the distance transformation labels each pixel by its shortest distance to the reference structure boundary;
   c) Generating orthogonal lines of equidistance contour;
   d) Extracting (u,v) locations of the transformed domain for each pixel.

8. The method of claim 6 further comprising an automatic decomposition step including sequential application of operations for decomposition region selection and selected decomposition region exclusion.

* * * * *